(12) United States Patent
Perego et al.

(10) Patent No.: US 9,697,927 B2
(45) Date of Patent: Jul. 4, 2017

(54) CABLE COMPRISING AN ELEMENT INDICATING WATER INFILTRATION AND METHOD USING SAID ELEMENT

(71) Applicant: PRYSMIAN S.p.A., Milan (IT)

(72) Inventors: Gabriele Perego, Milan (IT); Rodolfo Sica, Milan (IT)

(73) Assignee: PRYSMIAN S.P.A., Milan (IT)

( * ) Notice: Subject to any disclaimer, the term of this patent is extended or adjusted under 35 U.S.C. 154(b) by 322 days.

(21) Appl. No.: 14/633,454

(22) Filed: Feb. 27, 2015

(65) Prior Publication Data

US 2015/0168662 A1    Jun. 18, 2015

Related U.S. Application Data

(63) Continuation of application No. 14/366,178, filed as application No. PCT/EP2011/073948 on Dec. 23, 2011, now abandoned.

(51) Int. Cl.
*H01B 7/17*    (2006.01)
*G02B 6/44*    (2006.01)
*H01B 7/32*    (2006.01)

(52) U.S. Cl.
CPC ............ *H01B 7/17* (2013.01); *G02B 6/4429* (2013.01); *G02B 6/4494* (2013.01); *H01B 7/322* (2013.01); *G02B 6/4433* (2013.01)

(58) Field of Classification Search
CPC ........ G01N 21/81; G01N 31/223; G02B 6/44; G02B 6/4429; G02B 6/4433; G02B 6/4494; H01B 7/17; H01B 7/32; H01B 7/322; H01B 7/324; H01B 7/326; H01B 7/328

USPC .......... 116/200, 201, 206; 174/11 R; 285/93
See application file for complete search history.

(56) References Cited

U.S. PATENT DOCUMENTS

| | | | | | |
|---|---|---|---|---|---|
| 3,445,805 | A | * | 5/1969 | McLoad | H01R 13/5221 174/11 R |
| 4,344,909 | A | * | 8/1982 | De Blauwe | B29C 61/06 116/207 |
| 4,877,923 | A | * | 10/1989 | Sahakian | H01B 7/322 174/11 R |
| 5,337,376 | A | * | 8/1994 | Ravetti et al. | G01N 21/7703 250/227.14 |
| 7,631,666 | B1 | * | 12/2009 | Ng et al. | F16L 11/081 116/206 |
| 2009/0035865 | A1 | | 2/2009 | DeMoor et al. | |

FOREIGN PATENT DOCUMENTS

| | | | | |
|---|---|---|---|---|
| DE | 3045418 A1 | * | 6/1981 | ............ H01B 7/322 |
| EP | 2 196 184 | | 6/2010 | |
| GB | 1 420 365 | | 1/1996 | |
| JP | 61260204 A | * | 11/1986 | ............... G02B 6/44 |
| JP | 63211390 A | * | 9/1988 | ............... H02G 1/02 |
| JP | 63293512 A | * | 11/1988 | ............... G02B 6/44 |

(Continued)

OTHER PUBLICATIONS

International Search Report from the European Patent Office for International Application No. PCT/EP2011/073948, mailing date Sep. 5, 2012.

*Primary Examiner* — R. A. Smith
(74) *Attorney, Agent, or Firm* — Finnegan, Henderson, Farabow, Garrett & Dunner, L.L.P.

(57) ABSTRACT

A cable includes an indicating element for detecting the infiltration of water into the cable and a method using such indicating element.

16 Claims, 3 Drawing Sheets

(56) References Cited

FOREIGN PATENT DOCUMENTS

| JP | 02036329 A | * | 2/1990 | ............ G01M 3/04 |
| JP | 2014038046 A | * | 2/2014 | ............ G02B 6/44 |
| WO | WO 02/03398 | | 1/2002 | |
| WO | WO 02/27731 | | 4/2002 | |
| WO | WO 2004/066318 | | 8/2004 | |
| WO | WO 2007/048422 | | 5/2007 | |
| WO | WO 2008/058572 | | 5/2008 | |

* cited by examiner

CABLE COMPRISING AN ELEMENT INDICATING WATER INFILTRATION AND METHOD USING SAID ELEMENT

CROSS REFERENCE TO RELATED APPLICATIONS

This application is a continuation of U.S. application Ser. No. 14/366,178, filed Jun. 17, 2014, which is a national phase application based on PCT/EP2011/073948, filed Dec. 23, 2011, the content of both applications being incorporated herein by reference.

FIELD OF THE INVENTION

The present invention relates to cable for power transmission/distribution or for telecommunication. In particular, the present invention relates to a cable comprising an element for spotting prolonged contact between the cable, in particular the cable core, and water.

The present invention further relates to a method for detecting the absence of prolonged contact of a cable core with water.

BACKGROUND ART

Electric cables may be used for both direct current (DC) or alternating current (AC) transmission or distribution.

Cables for power transmission or distribution at medium or high voltage generally are provided with a metallic electric conductor (usually aluminium or copper) surrounded—from the radially innermost layer to the radially outermost layer—with an inner semiconductive layer, an insulating layer and an outer semiconductive layer respectively.

In the present description, the term "medium voltage" is used to refer to a voltage typically from about 1 kV to about 30 kV and the term "high voltage" refers to a voltage above 30 kV.

Telecommunication cables typically comprises at least one telecommunication conductor, e.g. an optical fibre contained in a tube optionally together with water swellable elements in form of gel, yarns or powder. Depending on the size and on the scope intended for the telecommunication cable, the tube is in turn contained in a sheath.

As "cable core" it is herein meant the portion of the electric or telecommunication cable comprising the electric or telecommunication conductor and the adjacent cable elements.

Many problems can arise due to water contacting the cable core.

In the case of electric cables, conductor and insulating layer are particularly sensitive to such a contact. Water can induce corrosion of aluminium conductors and cause the formation of gaseous hydrogen in the insulating layer, the so-called "water-treeing" phenomenon can impair the dielectric strength and bring to cable perforation during operation.

In the case of telecommunication cables, the optical fibre telecommunication conductors can undergo attenuation phenomena in contact with water. Also, water can reach and degrade closure or other termination device and/or can damage electronics mounted within the closure or other termination device.

Thus, the penetration of water into cables, and stagnation therein, is an event that should be avoided as it spoils the cable reliability.

After manufacturing, cables are usually stored and shipped with protection caps on their heads.

However, the penetration and stagnation of water within the cable core can occur despite the above precautions. In particular, water penetration and stagnation cannot be excluded during installation, for example due to negligence of the installing personnel.

Water diffused into a cable via cable head can be eliminated by, for example, blowing nitrogen. The problem is when the water penetration and stagnation in a cable is not readily visible because, for example, the cable head dried before inspection. In such instance, water can have caused damages to the cable core and can even be still present in the cable in a position distant from the cable head.

GB 1,420,365 relates to an electric cable, which is self-sealing upon penetration by water, comprising one or more insulated conductors located within a cable sheath, said cable sheath accommodating a composition consisting of a material or a mixture of materials which significantly changes colour when contacted by water, together with a material or a mixture of materials which swells and optionally evolves a gas when in contact with water.

A mixture of materials, which change colours, comprises potassium ferrocyanide and ammonium iron(III) sulfate. The dry mixture is white/yellow but following contact with water it turns to an intense blue (for example, Prussian blue). Alternatively, materials which when dry display only little colour or no colour at all, but which yield an intensely coloured aqueous solution may alternatively be used (for example, Astra diamond green).

The Applicant noted that the materials or mixtures disclosed above react as soon as they come into contact with water. Such fast reactions are not desired because could generate useless alarm. As a fact, brief water washings do not substantially harm the cable integrity.

High sensitivity of the material to humidity or moisture is equally undesirable as it could give place to unwanted reaction also at the manufacturing stage.

SUMMARY OF THE INVENTION

The Applicant faced the problem of distinguishing when the contact between cable and water lasted enough to compromise the operability of the cable, rather than when such a contact was brief and harmless.

The Applicant noted that cable cores are not damaged if the contact with water last for few minutes (usually until 10 minutes), as it can happen, for example, during manufacturing process, due to accidental contact with droplets of waters.

The Applicant found that the above problem can be solved by providing cables with an indicating element capable of changing appearance when continuously contacted by water for a significant time period.

Said indicating element allows avoiding unnecessary alarms that may arise after a short contact time between the electric cable and water.

In addition of being substantially inert to humidity or moisture, the indicating element should irreversibly change appearance when in contact with water for a significant time period. Such a characteristic allows the indicating element to spot prolonged contact between the cable and water even after a long period and/or after drying.

In a first aspect, the present invention relates to a cable comprising at least one cable core containing an indicating element irreversibly discolouring after being in contact with water for a time of at least 10 minutes.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

The cable of the present invention can be an electric cable for power transmission/distribution or a telecommunication cable.

In the case of an electric cable, the term of "cable core" indicates—the present description and claims—an electric conductor surrounded and in contact with a protecting layer. The protecting layer can be selected from insulating layer and inner semiconducting layer, the latter being in turn surrounded and in contact with an insulating layer.

The electric conductor of the cable of the invention can be made of aluminium, copper or composites thereof. The conductor can be in form of a metal rod or of metal stranded wires.

Electric cables of the present invention can further comprise an outer semiconductive layer, being provided to contact and surround the insulating layer.

Preferably, electric cables of the invention have three cable cores.

As for telecommunication cables, the term of "cable core" indicates—the present description and claims—at least one optical fibre surrounded by a retaining tube. The retaining tube can house water swellable material in form of gel, yarn or powder.

In the present description and claims as "optical fibre" is meant a telecommunication transmission element and a cladding surrounding it, both telecommunication transmission element and cladding being typically made of glass, and a coating system surrounding the cladding, said coating system comprising at least one coating layer, generally two, based on a UV or IR curable polymer.

The coating system of the optical fibre transmission core can be surrounded by buffer layer made of a thermally curable material.

Telecommunication cables of the invention can further comprise an outer sheath housing at least one cable core.

In the present description and claim the verb "to discolour" is intended to mean changing, acquiring or loosing colour.

Advantageously, the indicating element of the cable of the invention comprises a water-insoluble marker irreversibly discolouring after being in contact with water for a time of at least 10 minutes.

The marker of the indicating element of the invention takes at least 10 minutes in contact with water to display an irreversible discolouring.

In addition of being substantially inert to humidity or moisture, the marker should be insoluble or very low soluble in water. Such a characteristic avoid the marker being washed away by short water contacts.

In the present description and claims as "water-insoluble" it is meant a substance incapable or negligibly capable of dissolving into water and accordingly being removed from its location in the cable by solution in water.

Preferably the marker of the invention has a solubility in water less than 1 g, more preferably less than 0.5 g in 100 g of water measured at a temperature of 20° C. The marker of the invention can be insoluble in water having a solubility of 0 g in 100 g of water.

Said marker is capable of maintaining the appearance taken after prolonged contact with water even when dried.

Advantageously, said marker is soluble in organic solvents. Preferably, the marker is soluble in at least one organic solvent selected from methanol, ethanol, n-propanol, i-propanol, n-butanol, sec-butanol, tert.-butanol, acetone, butanone, 3-petanone, methyl isopropyl ketone, methyl isobutyl ketone, ethyl acetate, acetic acid, ethyl ether, di-tert.-butylether, diisobutyl ether, methyl acetate, propyl acetate, butyl acetate, cyclohexane, tetrahydrofuran.

The marker for the cable of the invention is, preferably, an acid-base indicator, In the present description and claims as "acid-base indicator" it is meant a substance (or dye) which discolours with the variation of the pH value.

Acid-base indicators suitable for the present invention are dyes able to discolour with pH changing in a range of from 3.5 to 8.0, preferably of from 5.0 to 7.5.

Preferably, said marker is heat-resistant at least up to about 100° C. More preferably, said marker is heat-resistant up to about 150° C. and, even more preferably, up to about 200° C.

In the present description and claims, as "heat-resistant" indicates a substance that, up to a predetermined temperature, does not undergo degradation phenomena possibly impairing the physical-chemical characteristics thereof.

For example, the marker can be selected from the group comprising acridine, alizarin red, benzaurin, bromocresol purple, bromophenol red, bromothymol blue, bromoxylenol blue, 5-carboxy-fluorescein diacetate, 6-carboxy-fluorescein diacetate, 5(6)-carboxy-fluorescein diacetate succinimidyl ester, 5-carboxy-naphtha-fluorescein, 6-carboxy-naphtha-fluorescein, 5-carboxy-naphtho-fluorescein diacetate, chlorophenol red, δ-dinitrophenol, fluorescein diacetate, fluorescein-5-isothiocyanate, gallein, heptametoxy red, lurninol, 4-methylesculetin, methyl red, 4-nitrocatechol, p-nitrophenol, phenolbenzein, phenolmalein, propyl red, pyrogallolphthalein, resorcein, resorcinmalein, resorufin and rhodol green.

Most preferably, said marker is alizarin red.

In a preferred embodiment, indicating element of the cable of the invention comprises a supporting material.

Preferably, the marker for the cable of the invention is associated with a supporting material. For example, the marker for the cable of the invention can be absorbed in or adsorbed on the supporting material.

Supporting materials suitable for the present invention are preferably chemically/physically inert to water.

Supporting materials suitable for the present invention are preferably heat-resistant at least up to 100° C.

Advantageously, the supporting material is heat-resistant up to 150° C., more preferably up to 200° C.

Supporting materials suitable for the invention are preferably polymeric material, either natural or synthetic.

For example, the supporting material can be cellulose, polyamide or polyesters.

The supporting material can be provided in various forms suitable for the cable construction, for example in form of threads, yarns, tapes or sheets.

The average amount of marker associated to the supporting material preferably ranges from $4 \cdot 10^{-4}$ g to $12 \cdot 10^{-4}$ g per 1 g of supporting material.

In the cable of the present invention the indicating element can be present in at least one of the following positions: in the case of electric cable within the metal wires of the conductor or at the interface between the conductor and the protecting layer (either an insulating layer or a semiconductive layer); in the case of telecommunication cable, bundled with the optical fibre/s within the retaining tube.

In a second aspect, the present invention relates to a process for producing a cable comprising at least one cable core containing an indicating element that irreversibly discolours after being in contact with water for a time of at least 10 minutes, said indicating element comprising a marker and a supporting material, wherein the marker is associated to the supporting material by dissolving the marker in an organic solvent to provide a solution;
impregnating the supporting material with said solution;
evaporating the organic solvent to dry the supporting material and provide the indicating element.

Advantageously, the marker is dissolved in an organic solvent at a concentration of, preferably, up to 5 wt %.

Preferably, the solution of the marker into the organic solvent is a saturated solution.

Preferably, said organic solvent has a boiling temperature below 150° C., more preferably below 100° C.

The organic solvent of the process of the invention is selected from those already mentioned above as solvents where the marker is soluble in.

Following evaporation of the organic solvent, the supporting material with the marker enters into the cable manufacturing through paying off station depending on the desired position of the marker within the cable.

The indicating element according to the present invention may be advantageously used in a method for detecting if a cable has been in contact with water for a period of time sufficient to compromise the operability of the cable itself.

Thus, in a third aspect, the present invention relates to a method for detecting absence of contamination by water in a cable, said method comprising the steps of:

providing a cable comprising at least one cable core containing an indicating element capable of irreversibly discolouring after being in contact with water for a time of at least 10 minutes;
causing the cable to get in contact with water for less than 10 minutes, and
verifying the indicating element remained unchanged.

BRIEF DESCRIPTION OF THE FIGURES

The present invention will be better understood by reading the following detailed description, given by way of example and not of limitation, to be read with the accompanying drawings, wherein.

DETAILED DESCRIPTION OF THE INVENTION

Figure 1:
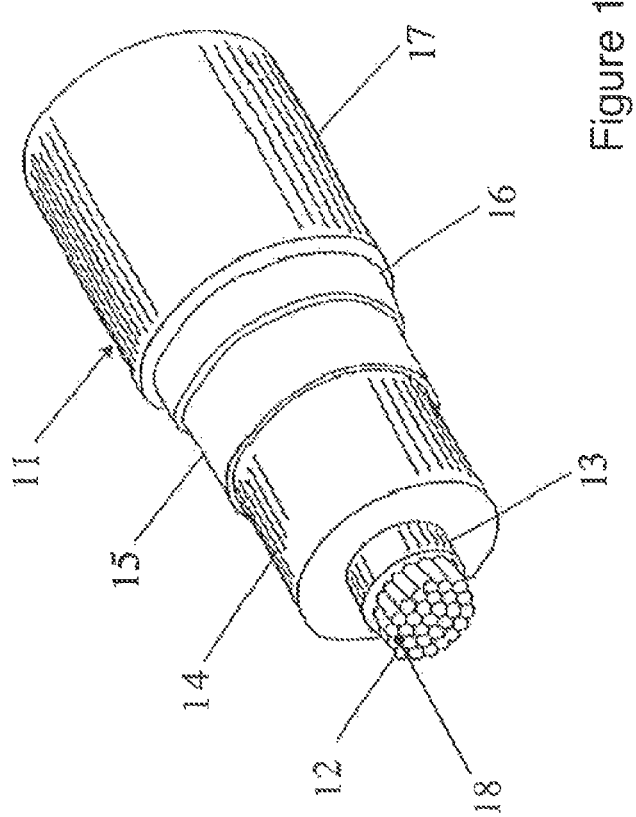
FIG. 1 shows a perspective view of an electric cable according to an embodiment of the present invention.

FIG. 1 shows a perspective view of an electric cable 11 according to an embodiment of the present invention.

The electric cable 1 of FIG. 11 comprises a conductor 12, an inner semiconductive layer 13, an insulating layer 14, which constitute the cable core. The cable core is surrounded by an outer semiconductive layer 15, a metal shield 16 and an outer sheath 17.

The conductor 12 generally comprises metal wires, which are preferably made of copper or aluminium, and which are braided together by using conventional technique.

The cross sectional area of the conductor 12 is determined in relationship with the power to be transported at the selected voltage. Preferred cross sectional areas for electric cables according to the present invention range from 16 $mm^2$ to 1,600 $mm^2$.

Inner semiconductive layer 13, insulating layer 14 and outer semiconductive layer 15 are made polymeric material.

Polymeric materials suitable for layers 13, 14 and 15 can be selected from the group comprising: polyolefins, copolymers of different olefins, copolymers of an olefin with an ethylenically unsaturated ester, polyesters and mixtures thereof.

Examples of suitable polymers are: polyethylene (PE), in particular low density PE (LDPE), medium density PE (MOPE), high density PE (HDPE), linear low density PE (LLDPE), ultra-low density polyethylene (ULDPE); polypropylene (PP) and copolymers thereof; elastomeric ethylene/propylene copolymers (EPR) or ethylene/propylene/diene terpolymers (EPDM); natural rubber; butyl rubber; ethylene/vinyl ester copolymers, for example ethylene/vinyl acetate (EVA); ethylene/acrylate copolymers, in particular ethylene/methyl acrylate (EMA), ethylene/ethyl acrylate (EEA) and ethylene/butyl acrylate (EBA); ethylene/α-olefin thermoplastic copolymers; and copolymers thereof or mechanical mixtures thereof.

In the case of inner semiconductive layer 13 and outer semiconductive layer 15, the above listed polymeric materials are added with an electro-conductive carbon black, for example electro-conductive furnace black or acetylene black, so as to confer semiconductive properties to the polymer material.

The insulating layer 14 can be made of polymeric a thermoplastic material, which comprises a thermoplastic polymer material including a predetermined amount of a dielectric liquid. Example of thermoplastic insulating layers are disclosed in WO 02/03398, WO 02/27731, WO 04/066318, WO 07/048422 e WO 08/058572

Preferably, the metal shield 16 is made of a continuous metal tube or of a metal sheet shaped into a tube and welded or sealed using an adhesive material so as to make it watertight.

In a preferred embodiment, the metal shield 16 is made of a continuous metal sheet, preferably of aluminium or copper, which is shaped as a tube.

The outer sheath 17 preferably is made of polymer material, such as polyvinyl chloride (PVC) or polyethylene (PE).

In the embodiment of FIG. 1, an indicating element 18, in form of a yarn supporting material impregnated with a marker of the invention, is provided within the metal wires of the conductor 12. More than one yarn can be present within the metal wires of the conductor/s.

Figure 2:
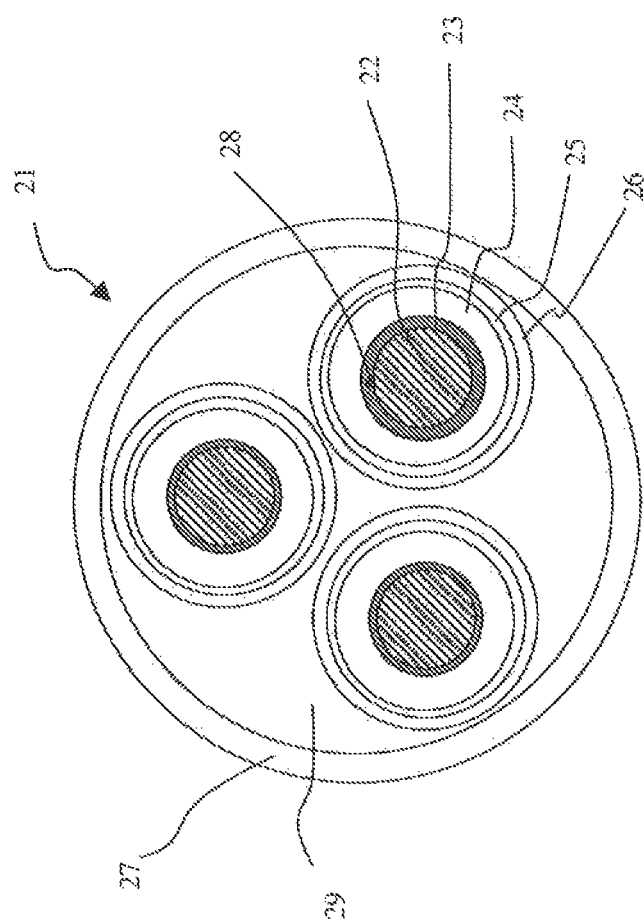
FIG. 2 shows a cross section of an electric cable according to another embodiment of the present invention.

FIG. 2 shows another embodiment of the invention. FIG. 2 illustrates a cable 21 comprising three cable cores. Each cable core comprises a conductor 22, an inner semiconductive layer 23, an insulating layer 24. Each cable core is surrounded by an outer semiconductive layer 25 and by a metal shield 26 and an outer sheath 17. Conductors 22 are each made of a solid aluminium rod.

The three cable cores are stranded and embedded into filler (or bedding) 29 which, in turn, is surrounded by an outer sheath 27. Outer sheath 27 can be made of the same material already disclosed in connection with outer sheath 17 of FIG. 1.

The materials of inner semiconductive layer 23, insulating layer 24, and outer semiconductive layer 25 can be as those already mentioned in connection with cable 11 of FIG. 1 for analogous cable portions.

In the embodiment of FIG. 2, an indicating element 28, in form of a yarn supporting material impregnated with a marker of the invention, is provided at the interface between conductor 22 and the adjacent protecting layer, in the present case the inner semiconductive layer 23 of at least one cable core.

Indicating element 28 can be provided for each cable core of a multicore cable.

The indicating element 28 can be, alternatively or additionally, a yarn or tape wound around the conductor/s 22.

Figure 3:
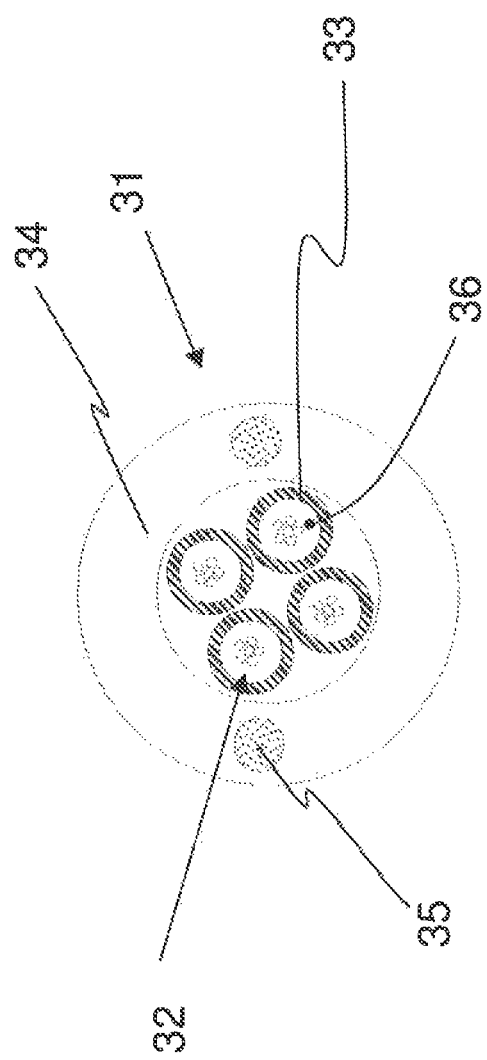
FIG. 3 shows a cross section of a telecommunication cable according to a further embodiment of the present invention.

FIG. 3 shows a cross section of a telecommunication cable 31 according to an embodiment of the invention. A group 32 of six optical fibres are loosely contained in a retaining tube 33 to constitute the cable core. Cable 31 comprises four cable cores contained in a polymeric sheath 34. Embedded in the sheath 34 are two radially opposed strength members 35 made, for example, of fibres glass or Kevlar®.

An indicating element 36, in form of a yarn supporting material impregnated with a marker of the invention, is provide within the retaining tube 33.

The yarn 18,28,36 is made of cotton.

The marker supported by the yarn 18,28,36 is alizarin red, an acid-base indicator of formula CAS Registry Number 72-48-0, which is yellow at pH 5.5 and irreversibly turns to red at pH 6.8

Alizarin red is virtually insoluble in water and soluble, for example, in ethanol and acetic acid. The melting point is of about 290° C.

The cable according to the present invention can be manufactured by process known to the skilled in the art. The indicating element can be paid using common process apparatus at a suitable step of the manufacturing process. For example, when the indicating element is to be positioned within the wires of an electric conductor, the indicating element in form of yarn/s is stranded together with the wires. For example, when the indicating element is to be positioned between the electric conductor and the protecting layer (insulating layer or inner semiconducting layer), the indicating element in form of yarn/s or tape is wound around the conductor before extruding said layer. For example, when the indicating element is to be positioned within a retaining tube for housing optical fibres, the indicating element in form of yarn/s is joined to the optical fibre bundle and the polymeric material is extruded around according to known technique.

The following examples are intended to further illustrate the present invention, without however restricting it in any way.

Example 1

Alizarine red (0.0206 g) was dissolved, at room temperature, in n-butyl alcohol (85 ml) to provide a saturated solution.

Two samples of white 100% cotton yarn (510 dtex; weight of 0.23 g/m) were immersed into the resulting solution, kept them until impregnated, then taken off and dried in an oven at 50° C. for 5 minutes. Both the dried samples became yellow cream-coloured. The red alizarine content in the yarn was of about $2 \cdot 10^{-4}$ g/m.

Subsequently, one sample yellow cream-coloured was immersed in tap water, at room temperature, for 20 minutes, while the other was immersed in tap water for 10 days.

Alter about 15 minutes from the immersion in water both the samples became red-purple. The sample left in immersion for 10 days did not loose colour. Both the samples maintained such colour even after complete drying.

The test was repeated by dissolving to saturation red alizarine in acetone and ethyl acetate. Equivalent results were obtained.

Comparative Example 1

A paper tape sample was immersed for 5 minutes in an aqueous solution of methylene blue at 2 wt % at room temperature, until impregnation. The sample was then taken off and dried in an oven at 60° C. for some hours.

The dried sample was immersed in tap water and kept therein for 24 hours without any stirring. No discoloring was observed.

Methylene blue, though soluble in water, was not washed off. Subsequent tests performed also under mild stirring provided ambiguous results, i.e. in some cases the paper tapes resulted somewhat discoloured, but not in an unquestionable way.

The use of a water soluble dye as methylene blue does not provide affordable results and is not suitable for the indicating element according to the invention.

Comparative Example 2

A paper tape sample was dipped for 5 minutes in an aqueous suspension of calcium hydroxide at room temperature. The sample was then dried in an oven at 60° C. for some hours.

The dried sample was immersed in an alcoholic solution of phenolphthalein at 1 wt % and kept therein for 5 minutes, then taken off and dried in an oven at 60° C. for 30 minutes.

The dried sample, having substantially the original colour of the tape, was then immersed into tap water and immediately displayed a vivid pink colour due to phenolphthalein turning. Remaining the sample immersed into water, the pink colour of the sample started to fade and completely disappeared after a couple of hours.

Due to the solubility in water, phenolphthalein cannot be used in an indicating element of the present invention.

The invention claimed is:

1. A cable comprising at least one cable core comprising an indicating element that irreversibly discolours after being in contact with water for at least 10 minutes.

2. The cable according to claim 1, wherein the cable is an electric cable for power transmission/distribution comprising a cable core comprising an electric conductor surrounded and in contact with a protecting layer.

3. The cable according to claim 1, wherein the cable is a telecommunication cable comprising a cable core comprising at least one optical fibre surrounded by a retaining tube.

4. The cable according to claim 1, wherein the indicating element comprises a water-insoluble marker irreversibly discolouring after being in contact with water for at least 10 minutes.

5. The cable according to claim 4, wherein the marker has a solubility in water of less than 1 g in 100 g of water.

6. The cable according to claim 4, wherein the marker is soluble in organic solvents.

7. The cable according to claim 4, wherein the marker is an acid-base indicator.

8. The cable according to claim 4, wherein the marker is an acid-base indicator able to discolour with pH changing in a range of 3.5 to 8.0.

9. The cable according to claim 4, wherein the marker is heat-resistant at least up to 100° C.

10. The cable according to claim 4, wherein the marker is associated with a supporting material.

11. The cable according to claim 1, wherein the indicating element comprises a supporting material.

12. The cable according to claim 11, wherein the supporting material is chemically/physically inert to water.

13. The cable according to claim 11, wherein the supporting material is heat-resistant at least up to 100° C.

14. A process for producing a cable comprising at least one cable core containing an indicating element that irreversibly discolours after being in contact with water for at least 10 minutes, said indicating element comprising a marker and a supporting material, wherein the marker is associated with the supporting material by
    dissolving the marker in an organic solvent to provide a solution;
    impregnating the supporting material with said solution; and
    evaporating the organic solvent to dry the supporting material and provide the indicating element.

15. The process according to claim 14, comprising dissolving the marker in an organic solvent to provide a saturated solution.

16. A method for detecting absence of contamination by water in a cable, comprising:
    providing a cable comprising at least one cable core containing an indicating element that irreversibly discolours after being in contact with water for at least 10 minutes;
    causing the cable to get in contact with water for less than 10 minutes; and
    verifying the indicating element remained unchanged.

\* \* \* \* \*